(12) United States Patent
Luderich et al.

(10) Patent No.: US 11,960,148 B2
(45) Date of Patent: Apr. 16, 2024

(54) EYEGLASS LENS AND METHOD OF MAKING SAME

(71) Applicant: SHAPE ENGINEERING GMBH, Cologne (DE)

(72) Inventors: Joerg Luderich, Ratingen (DE); Christian Poepperl, Solingen (DE); David Frings, Hemer (DE)

(73) Assignee: SHAPE ENGINEERING GMBH, Cologne (DE)

( * ) Notice: Subject to any disclaimer, the term of this patent is extended or adjusted under 35 U.S.C. 154(b) by 763 days.

(21) Appl. No.: 16/975,597

(22) PCT Filed: Mar. 8, 2019

(86) PCT No.: PCT/EP2019/055867
§ 371 (c)(1),
(2) Date: Aug. 25, 2020

(87) PCT Pub. No.: WO2019/179791
PCT Pub. Date: Sep. 26, 2019

(65) Prior Publication Data
US 2021/0011308 A1   Jan. 14, 2021

(30) Foreign Application Priority Data
Mar. 22, 2018 (DE) ...................... 10 2018 002 384.3

(51) Int. Cl.
*G02C 7/02* (2006.01)
*B29D 11/00* (2006.01)
*G02B 1/16* (2015.01)

(52) U.S. Cl.
CPC ........ *G02C 7/024* (2013.01); *B29D 11/00009* (2013.01); *G02B 1/16* (2015.01)

(58) Field of Classification Search
CPC .......... G02C 7/02; G02C 7/024; G02C 11/10; G02C 2200/02; G02B 1/16;
(Continued)

(56) References Cited

U.S. PATENT DOCUMENTS

| | | |
|---|---|---|
| 3,565,517 A | 2/1971 | Gitlin et al. |
| 5,220,358 A | 6/1993 | Brown |

(Continued)

FOREIGN PATENT DOCUMENTS

| | | |
|---|---|---|
| CN | 202256915 U | 5/2012 |
| CN | 203385957 U | 1/2014 |

(Continued)

*Primary Examiner* — William R Alexander
(74) *Attorney, Agent, or Firm* — Andrew Wilford

(57) ABSTRACT

An edge of a lens blank an eyeglass lens having a shaped edge is measured at a plurality of peripherally offset measuring positions and respective control values are generated corresponding thereto and supplied to an applicator. This applicator applies a hardenable material in liquid form to the edge of the eyeglass lens and is controlled such that an amount and/or position of the material is applied at the measuring positions according to the respective control values in a controlled manner. The hardenable material is chemically or radiation-cured to form on the edge of the lens a functional layer that has an optical, magnetic, electric, or electronic function.

8 Claims, 3 Drawing Sheets

(58) Field of Classification Search
CPC ........ B29D 11/00009; B29D 11/00865; B29D 11/00817
USPC .................................................... 351/159.74
See application file for complete search history.

(56) References Cited

U.S. PATENT DOCUMENTS

| | | | |
|---|---|---|---|
| 6,786,596 B1 * | 9/2004 | Ayoub | ............. B29D 11/00009 351/159.01 |
| 6,786,598 B2 | 9/2004 | Buazza | |
| 6,852,406 B2 | 2/2005 | Marechal et al. | |
| 6,860,600 B2 | 3/2005 | Chen | |
| 8,062,542 B2 | 11/2011 | Biteau et al. | |
| 8,083,349 B2 | 12/2011 | Ho | |
| 8,362,133 B2 | 1/2013 | Zheng | |
| 8,550,623 B2 | 10/2013 | Chen | |
| 9,851,584 B2 * | 12/2017 | Luderich | ................ B33Y 80/00 |
| 9,957,398 B2 | 5/2018 | Hugenberg et al. | |
| 10,126,623 B2 | 11/2018 | Goto et al. | |
| 10,558,045 B2 | 2/2020 | Hofmann et al. | |
| 10,670,777 B2 | 6/2020 | Prochnau et al. | |
| 10,705,351 B2 | 7/2020 | Perrot et al. | |
| 11,131,853 B2 | 9/2021 | Puetz et al. | |
| 2004/0032565 A1 * | 2/2004 | Yamakaji | ............... G02C 7/061 351/159.42 |
| 2009/0207374 A1 * | 8/2009 | Ho | .......................... G02C 7/12 351/159.62 |
| 2016/0306187 A1 * | 10/2016 | Luderich | .......... B29D 11/00009 |
| 2019/0105811 A1 | 4/2019 | Puetz et al. | |
| 2019/0330480 A1 | 10/2019 | Puetz et al. | |

FOREIGN PATENT DOCUMENTS

| | | |
|---|---|---|
| DE | 4220912 C1 | 7/1993 |
| DE | 102016124420 A1 | 6/2018 |
| JP | 10085647 A | 4/1998 |

\* cited by examiner

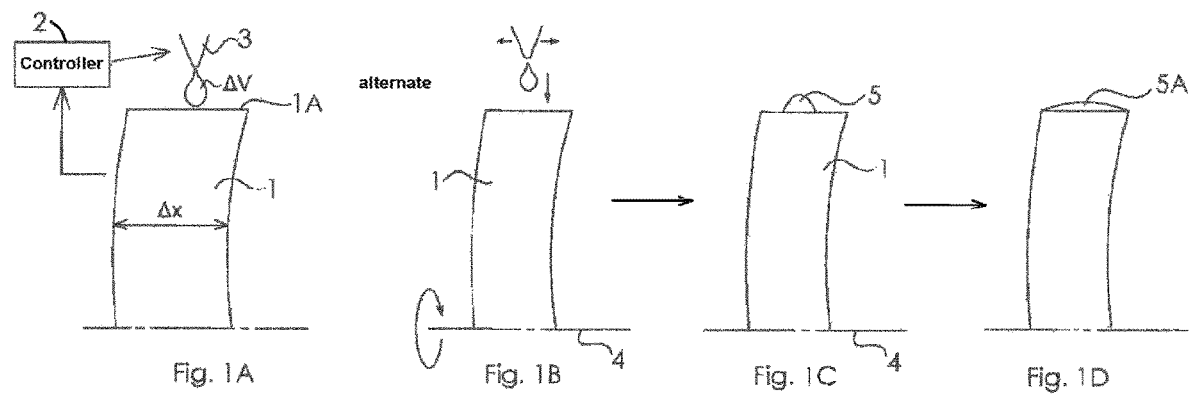
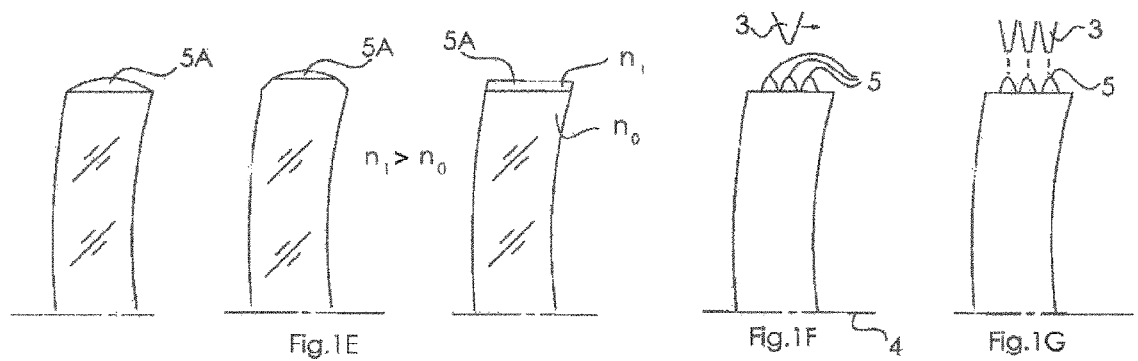
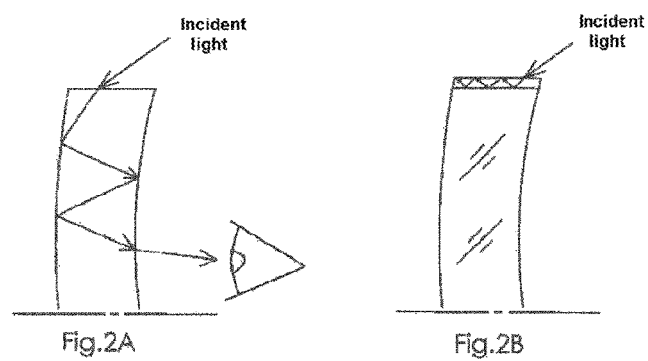

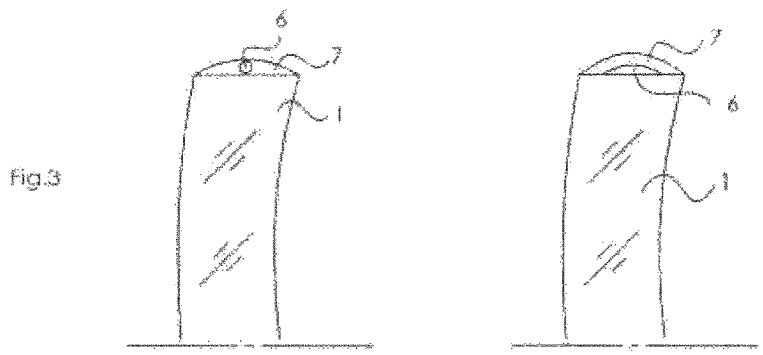
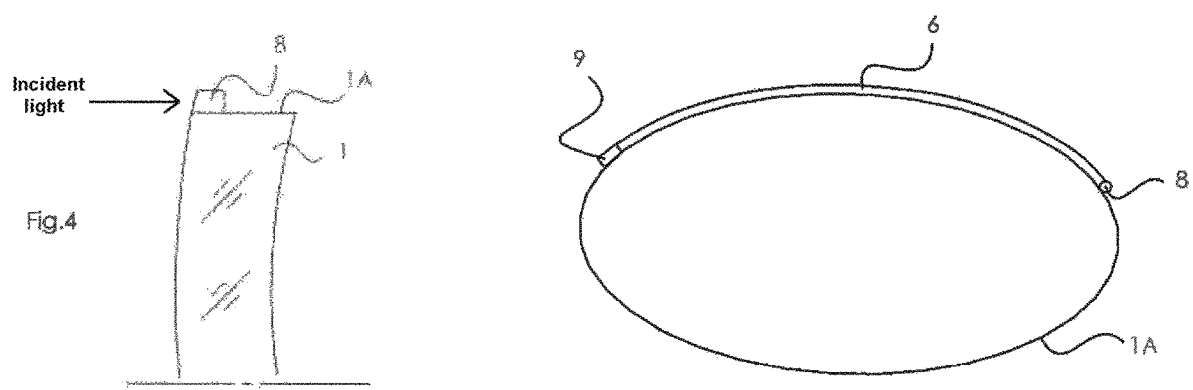
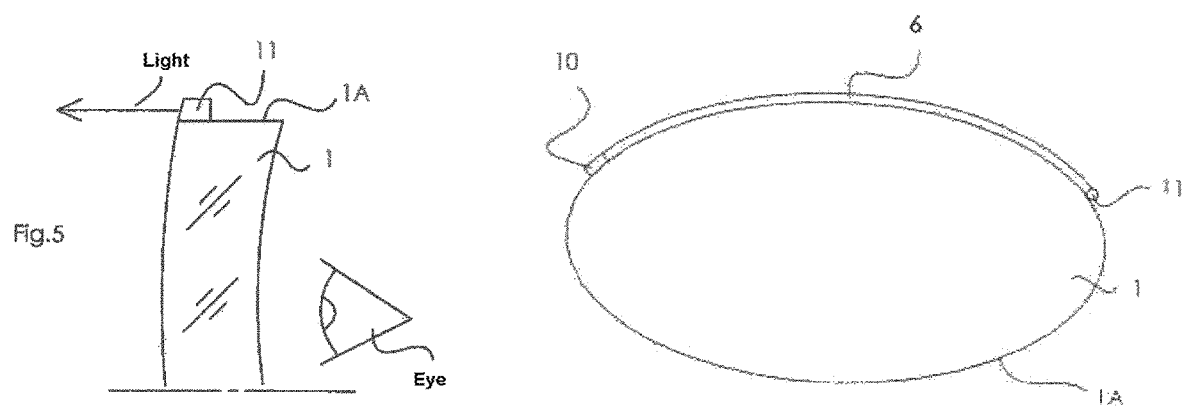
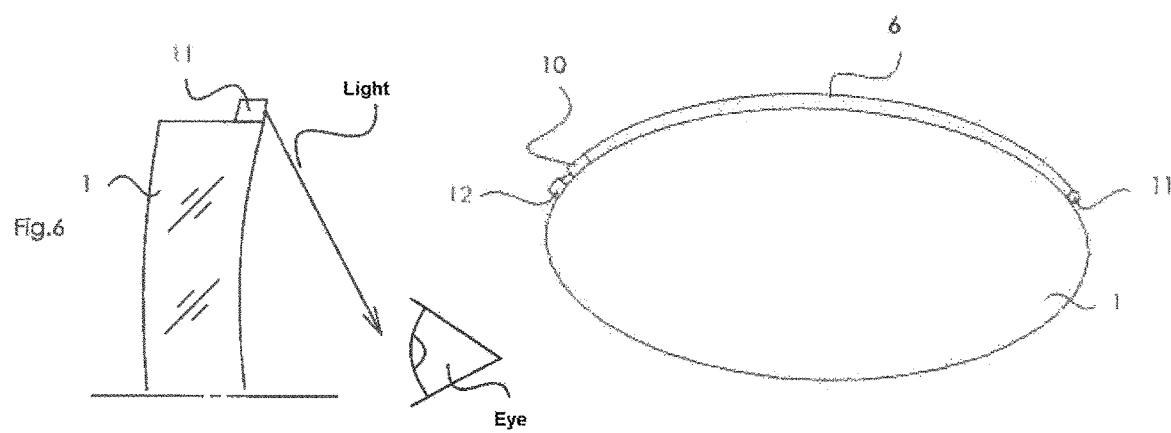

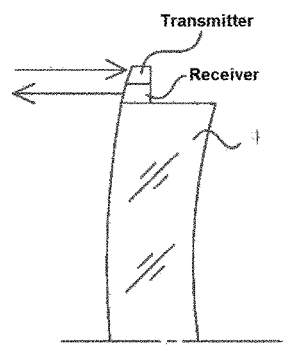
Fig.7
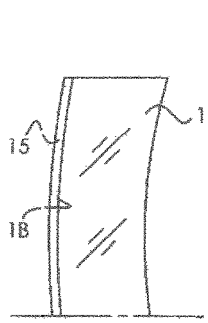
Fig.8
Fig.9
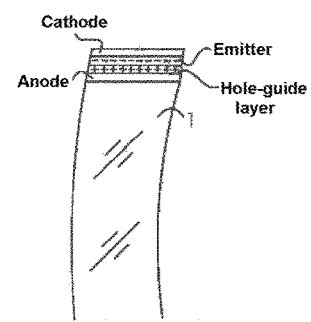
Fig.10 OLED
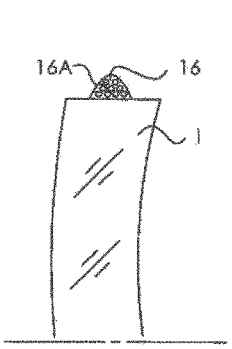
Fig.11a
Magnetic layer
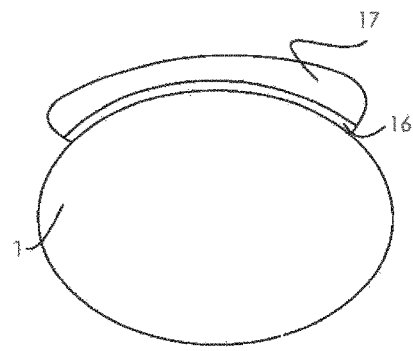
Fig.11b
Decorative element -
Magnetic layer
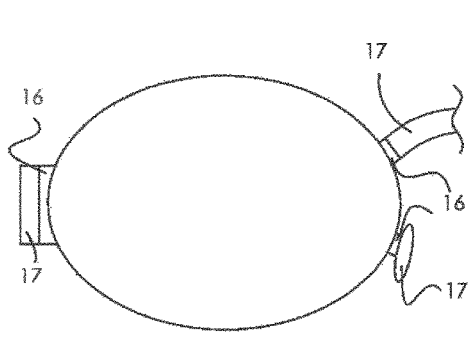
Fig.11c
Retention by
magnetic layer
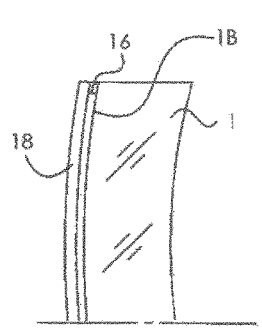
Fig.11d
Add-on lens -
Magnetic layer
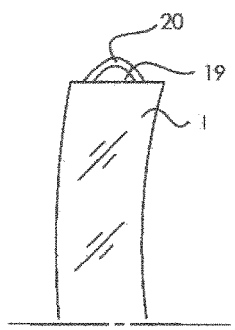
Fig.12a
Electrically
conductive
layer
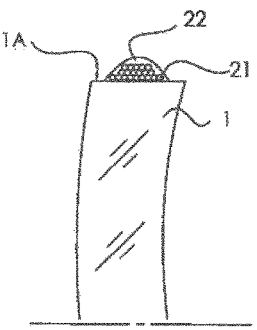
Fig.12b
Electrically
conductive
layer with
particles

EYEGLASS LENS AND METHOD OF MAKING SAME

CROSS REFERENCE TO RELATED APPLICATIONS

This application is the US-national stage of PCT application PCT/EP2019/055867 filed 8 Mar. 2019 and claiming the priority of German patent application 102018002384.3 itself filed 22 Mar. 2018.

The invention relates to an eyeglass lens that has on its outer edge and/or on its front or rear surface at least one functional layer formed by a substance that is applied in liquid form to the edge and/or the front or rear surface of the eyeglass lens, is chemically cured or radiation-cured, and is in particular integrally bonded with the eyeglass lens upon curing.

The invention furthermore relates to a method of making an eyeglass lens where a material is applied in liquid form to the edge and/or the front or rear surface of the edged eyeglass lens and is chemically cured or radiation-cured. Preferably, this results in an integral bond between the material of the eyeglass lens, that is in particular between glass or transparent plastic and the applied material.

Such an eyeglass lens and a method of making it are known from DE 10 2014 000 107 of applicant. This patent application describes applying a substance in liquid form onto an eyeglass lens in strands or droplets to form structural elements that serve to connect the lens to an eyeglass frame. A further function going beyond such a fastening function or even a protective function of the lens's edge is not mentioned in this publication. Application in strands or droplets may also be provided in the present invention.

According to the invention, an edged eyeglass lens is understood as one that has a shape around the optical axis that corresponds to a desired eyeglass lens shape as employed for example in a typical eyeglass frame. Such an eyeglass frame may also be a so-called rimless frame where the eyeglass lenses are only contacted by the frame elements in the region of the nosepiece and the frame bows.

Such an edged eyeglass lens is preferably one that is made from an eyeglass lens blank by machining the eyeglass lens from this blank, in particular by material removal or cutting, such as grinding or laser cutting. An eyeglass lens blank may in particular be a usually circular lens that is made with the required optical refractive power/diopter by a manufacturer.

It is perceived as a disadvantage in eyeglass lenses known from prior art that, apart from their typically provided function of correcting defects of vision or protecting from sunlight, they have no essential further functions or, if any further functions are present, these are realized by mechanically large-dimensioned pieces added onto the eyeglasses.

It is therefore an object of the invention to provide an eyeglass lens and a method of making same that further develops the eyeglass lenses and methods known in the prior art insofar as further functions are developed that go beyond a fastening function of applied substances or materials.

According to the invention, this object is achieved by the at least one functional layer mentioned in the beginning having an optical, magnetic, electric, or electronic function.

It is particularly preferred for a functional layer in accordance with the invention to have a layer thickness of smaller than 2 millimeters, preferably smaller than 1 millimeter, to ensure in this way that an applied functional layer is essentially not perceivable by a user and the aesthetic appearance of an eyeglass lens according to the invention is not affected. In a further preferred embodiment, the thickness of a functional layer may even be reduced beyond the above-described values, in particular be smaller than 500 µm, particularly preferably smaller than 250 µm.

According to the invention, a functional layer may be realized as to the method such that the material forming the functional layer is applied onto a surface of the eyeglass lens in liquid form, in particular onto the edge surface of the eyeglass lens that surrounds the eyeglass lens in the circumferential direction around the optical axis of the eyeglass lens, and that the material applied to the application surface spreads and then cures.

The application of the material spreads to form a layer that is thinner than the material application thickness as applied. According to the method, the curing process is selected such that either the chemical curing or the radiation curing will only start, or only be completed, after the material has spread or a predetermined time. Such a predetermined time may be preferably selected within a range of 1 to 10 seconds, further preferably 1 to 20 seconds, and even further preferably 1 to 30 seconds.

In a preferred embodiment, it may be intended in the manufacturing process that during the application of the material, the material amount is selected in response to the edge thickness of the eyeglass lens present at the point of application. Application locus is understood here as a circumferential position of the eyeglass lens on the edge. As the edge thickness increases, the amount of material will be in particular increased to ensure that sufficient material is present at any application position to cover the edge with the material in the desired layer thickness. At a given circumferential position, the material may be applied at different positions spaced apart in the direction of the optical axis or in the direction of the edge thickness.

It may be here intended according to the invention that, before application of the material, the edge of the edged eyeglass lens is measured as to its edge thickness at a plurality of measuring positions succeeding angularly, i.e. different circumferential positions, and that then the amount and/or axial position of the material application is adjusted in response to the detected measured values in a controlled way. Such controlling may be effected in connection with at least one applicator that extrudes the material onto the edge in liquid form, and the previously detected measured values are supplied to this applicator as control variables.

During application of the material, it may be provided that the eyeglass lens rotates about its optical axis, and the applicator is at least essentially stationary with respect to the eyeglass lens, and that optionally, a tip of the applicator from which the material exits may be moved parallel to the optical axis accordingly in the direction of the edge thickness, while the applicator, however, is stationary with respect to an angular position measured around the optical axis.

As an alternative, the applicator may be guided around a non-rotating eyeglass lens and the material may be applied from the applicator onto the eyeglass lens edge during this circumferential movement.

According to the invention, in a further development, the material to be applied may be applied, as seen in the circumferential direction of the eyeglass lens edge, in at least two strands, preferably at least two strands that are parallel. In particular if the edge thickness exceeds a limiting value, instead of only one strand, two or more strands may be applied according to the invention one next to the other to thus better homogenize the layer thickness during the process of the running of the applied material.

Application in a plurality of adjacent strands may be done by one and the same applicator one after another, that is this one applicator makes one strand after the other in the circumferential direction. However, according the invention, a number of applicators corresponding to the number of strands may also be used to apply the parallel strands onto the lens edge simultaneously one next to the other. It may be provided here according to the invention that in response to the edge thickness at a circumferential position of the eyeglass lens edge, only one or simultaneously a plurality of applicators is activated to apply the material. In particular if a limiting value of the edge thickness is exceeded, one switches from an application with only one applicator to a simultaneous application via a plurality of (at least two) applicators, and if this limiting value is not reached, the number of applicators is accordingly switched back.

The various functions that may be performed by the applied functional layer may result in a plurality of different embodiments of the invention.

In one possible embodiment, an optical function may be performed by the reproduction of a mechanical polish of the eyeglass lens edge. It is known for example that the edge of an machined eyeglass lens is polished to improve the optical appearance, meaning here the aesthetic appearance, and the edge appears to be less concise to the viewer. Such a mechanical polish by a polisher along the extension of the eyeglass lens edge involves considerable effort both as to time and equipment.

Compared to this, the invention offers the advantage that the edge, in particular along the complete circumferential extension of the edge, receives a layer of a material applied as a liquid that runs over the complete edge width upon application and before curing and will thereby form a smooth surface that gives, upon the solidification of the material, an optical impression as if the original lens edge had been polished.

This effect is essentially achieved by the spread of the applied functional layer having a smaller roughness than the roughness of the surface of the edge on which the functional layer is applied.

In particular in context with this embodiment, the variation to the invention already mentioned above may be reasonably employed, i.e. the amount of the material of the functional layer is applied in response to the edge width to thus ensure an even cover of the material over the complete edge.

The invention may here furthermore provide for the material of the functional layer to be selected such that its index of refraction differs from the index of refraction of the glass material, in particular, the index of refraction may be selected to be higher than the index of refraction of the material of the eyeglass lens to thus further achieve a total reflection taking place in the applied functional layer.

In another development of the invention, an optical function of the functional layer may also be performed by the functional layer to form a waveguide extending on or along at least part of the edge circumferentially of the lens.

Here, such a waveguide may be formed by one single functional layer, however, the invention also covers a plurality of functional layers, in particular ones having different indices of refraction, one upon the other on the edge of the eyeglass lens. In particular in a layer structure, such a waveguide may have a higher index of refraction in its outer layers than in at least one core layer therebetween.

Irrespective of the concrete embodiment of a waveguide function with at least one functional layer on the edge of the eyeglass lens, in one application, light may be guided by such a waveguide via a coupling element, for example via an element of the eyeglass lens frame, so that light is conducted from a light source that may be arranged for example at a bow of the frame into the functional layer via the coupling element, i.e. the waveguide, to thus guide the light along the lens edge to a desired point of action, in particular a point where the light is to be outputted. Such a function may be employed in eyeglasses with which the wearer of such eyeglasses wishes to illuminate his/her working space as is the case for example in the medical field for physicians or precision engineers.

In a manufacturing process according to the invention, for mounting a coupling element in the functional layer in the not yet cured material of the functional layer after its application and upon its curing, a coupling element may be inserted that serves to feed an optical signal into the cured layer. Such a coupling element may be for example a transparent spherical element, i.e. in particular a glass sphere.

This design of the execution of the method may not only be provided in connection with an optical effect of the functional layer, but in particular also in connection with an electric or electronic action of a functional layer, namely if input of an electric signal is to be provided via a coupling element. In this case, a coupling element may be realized by an electric plug-in element whose contacts reach into the functional layer that is electrically conductive.

A further development of the invention may provide that a functional layer performs an optical function by the functional layer forming a thermochromic or electrochromic layer on or along at least a partial area of the eyeglass lens surface, preferably the complete eyeglass lens surface. The eyeglass lens surface is understood as that surface of the eyeglass lens that serves the optical correction of a user's vision defect. Thus, these are the essentially large surfaces of the eyeglass lens, and not the edge surface.

This mentioned eyeglass lens surface, of which one eyeglass lens thus has two, is essentially arranged perpendicular to the optical axis of the eyeglass lens. A thermochromic layer here has the effect that with a temperature change, the light absorption of the layer is changed, this being effected in an electrochromic layer by different current feeds or different voltages.

In particular in the latter embodiment, the invention may also combine an optical function of a functional layer and an electric function of a functional layer, for example by providing a functional layer to form an electrochromic layer on the eyeglass lens surface and a further, electrically conductive functional layer on the lens edge to supply the required voltage or the required current for operation to the electrochromic layer.

The invention may provide in another further embodiment that by the functional layer with an optical function, a light-emitting element is formed. For example, such a functional layer may form an OLED. In particular also in this embodiment, functional layers with an optical function and an electric function may in turn be combined in order to form, on the one hand, the light-emitting element with an optical function, and in order to realize, on the other hand, a power line or voltage guidance to the functional layer with the optical function, such as the mentioned OLED, by means of a functional layer with an electric function.

In particular, the degree of transmission or reflection for light may be changed according to the invention, in particular lowered or increased, with respect to the eyeglass lens material by means of the functional layer to form optical functions. A functional layer may thus have, in its material, for example also an optical density different from that of the glass material of the eyeglass lens. A different optical density may here be provided both by a different index of refraction that is also achieved by absorbing materials within the material or by the material provided for the formation of the functional layer itself having a light absorption for light required for a desired optical effect.

In particular in case of very thin layer thicknesses, a functional layer may also invoke interference effects of the reflected light. In a particularly preferred embodiment, the thickness of the at least one functional layer is selected in a range of 1 to 10 times the optical wavelength to which an interference effect is to be generated.

One embodiment of the invention may intend that a functional layer performs a magnetic function by a magnetic field generated by the at least one functional layer itself, or that a magnetizability of the at least one functional layer is present under the action of an external magnetic field on the at least one functional layer.

It may be intended for example to embed magnetic or magnetizable particles into a functional layer. Such particles may be provided already in the liquid material to be applied that will form the functional layer upon application. Such magnetic or magnetizable particles are accordingly applied directly with the application of the material onto the surface of the eyeglass lens to be coated, in particular the eyeglass lens edge.

In a possible application, it may here be provided that such a functional layer serves to fasten other elements to an eyeglass lens. These may be for example elements of the eyeglass lens frame, such as a nosepiece or an eyeglass lens bow.

It may equally be provided to use further optically effective elements at the eyeglass lens via such a magnetic or magnetizable functional layer. For example, add-on glasses in the form of sunglasses may be fastened by magnetic action to such an eyeglass lens equipped according to the invention, which is in case such add-on glasses also have a magnetic or magnetizable element, so that such an element interacts with a magnetically acting functional layer of the eyeglass lens and a fastening of the add-on glasses to the eyeglass lens may be effected.

In general, an electric or electronic function of a functional layer may be performed by the functional layer being electrically conductive. For this, the material of the functional layer may be electrically conductive itself, or electrically conductive elements, in particular particles, may be embedded in the material. Here, too, such embedded electrically conductive particles may already be present in the liquid material during the application. In particular, the design may here be selected such that the conductive particles have, within the material of the functional layer and in particular then also upon curing in the finished functional layer, such a density that the particles touch each other and thus an electric current conductance without interruption is possible along the layer.

A functional layer may also form an insulator or a semiconductor.

One embodiment may here also intend that by the arrangement of a plurality of functional layers with respect to each other, in particular of a plurality of functional layers one upon and/or next to the other, at least one electric or electronic component is formed. Functional layers arranged in this manner may preferably have different electric properties, that is, in such an arrangement, conductive and/or non-conductive and/or semiconductive functional layers may be combined. By the totality of such an arrangement, for example an electric or electronic component may be formed.

In yet another embodiment, the invention may also provide for electric energy to be stored or, as an alternative, also be generated in a functional layer, for example by the incidence of light.

Embodiments of the invention are shown in the figures.

FIGS. 1 [A-G] show the application of a volume depending on an edge thickness Δx, for example a drop volume ΔV, of a liquid material onto an edge 1A of an edged eyeglass lens 1. For this, by an unillustrated sensor may detect the edge thickness Δx at the place of application and transmit it to a controller 2 that controls a metering device of an applicator 3, for example a nozzle.

FIG. 1B here shows that, when the eyeglass lens thickness is smaller than in FIG. 1A, the drop volume ΔV is smaller. It is furthermore shown that the eyeglass lens 1 may be rotated about the optical axis 4 during application.

According to FIGS. 1C and 1D succeeding in time, the applied row of drops or strand 5 of the material form the functional layer 5A while being applied, in particular until the edge 1A is completely covered. Then, according to FIGS. 1E, the functional layer 5A may be formed into various shapes, for example outwardly convex or flat.

FIG. 1F shows the possibility of applying a plurality of strands 5 of material spaced one after another by shifting the applicator 3 along the optical axis 4. FIG. 1G in contrast shows, as an alternative, the possibility of applying the plurality of strands 5 simultaneously via a plurality of applicators 3. In this example, three strands are shown, but that does not restrict the invention.

FIGS. 2A and 2B illustrate the advantageous effect of a functional layer acting as a polish (FIG. 2B), compared to a classic polish of the edge 1A (FIG. 2A). In the known polish, incident light is transported to the eye of the wearer of the glasses. In the functional layer of FIG. 2B acting as a polish, the light, however, remains captured in the functional layer due to the total reflection therein and thus does not disturb the wearer of the glasses. Preferably, the index of refraction of the functional layer is larger than that of the eyeglass lens for this, as already shown with respect to FIG. 1E on the right.

On the left, FIG. 3 shows a waveguide 6 embedded in a functional layer 7 that seals the edge of the eyeglass lens 1. Here, at least the seal is formed by the running and cured applied material.

On the right, FIG. 3 shows the possibility of providing a waveguide 6 underneath a seal 7. Here, the waveguide 6 and the seal 7 may be generated by various materials applied in liquid form and then cured. The application may be effected both for the waveguide 6 and the seal 7 as shown in FIGS. 1 [A-G].

FIG. 4 shows, in various views, a waveguide 6 extending along the eyeglass lens edge 1A that may be a strand of material applied in liquid form and then cured. The waveguide 6 here connects the input element 8 for light at one end to a photo-sensor system 9 at the other end. These two elements 8 and 9 may each be inserted into the still liquid material before curing.

FIG. 5 shows a connection between a source of radiation 10 and an emitting element 11 by a waveguide 6 that is applied, in accordance with the invention, as liquid material and then cured. Here, too, the source of radiation 10 and the emitting element 11 are preferably inserted into the still liquid material before curing.

Light from the source of radiation 10 may thus be transported along the edge 1A to the emitting element 11, in particular from there directed to the eye of the wearer of the eyeglasses, so that signaling is possible.

FIG. 6 shows a further development of FIG. 5 according to which a sensor 12 is also associated with the source of radiation 10, for example to control the source of radiation 10 depending on sensor values. Thus, depending on detected sensor values, signaling to the eye may be effected.

FIG. 7 shows the stacked arrangement of a transmitter and a receiver, for example for electromagnetic waves (for example light) that are embedded in the material applied in liquid form and cured.

According to FIG. 8, material applied in liquid form and cured for forming functional layers is layered onto the optically effective surface 1B (through which light penetrates in the direction of the optical axis 4) of the eyeglass lens 1, and also onto the edge 1A. The surface coating may form for example an electrochromic layer 13 and the functional layer may form an electric conductor 14 on the edge 1A by which this electrochromic layer 13 may be electrically controlled. To this end, the two layers 13 and 14 are contacted with each other, for example coupling at the transitional edge between the surfaces 1A and 1B. Thus, for example a toning or in general a change of color of the eyeglass lens 1 may be generated.

According to FIG. 9, the functional layer applied onto the surface 1B forms a thermochromic layer 15 of which the color/absorption is changed depending on temperature.

According to FIG. 10, a plurality of layers applied in a stack one upon the other form for example an OLED arrangement. The lowermost and uppermost layer may form electrode layers for feeding current to layers of an emitter layer and a hole-guide layer therebetween. All these layers may be applied in liquid form by a material provided for this and then cure, in particular essentially as illustrated in FIG. 1.

According to FIG. 11a, the material applied in liquid form and cured may form a magnetic or magnetizable layer 16, for example by magnetic/magnetizable particles 16A contained in a material.

FIG. 11b shows that such a layer 16 may serve as fastening means for example for a decorative element or in general for any other element 17 that may have a magnetic interaction with the layer 16. According to FIG. 11c, such accessories 17 may be embodied for example by frame elements (for example eyeglass bow, bridge, nose pad) of eyeglasses that are themselves magnetic or magnetizable and thus magnetically adhere to a magnetic/magnetizable functional layer 16.

According to FIG. 11d, a magnetic/magnetizable functional layer 16 may also be arranged on the front surface 1B of an eyeglass lens 1 and for example serve for fastening an add-on lens 18 that magnetically adheres thereto.

FIG. 12a shows the embodiment of an electrically conductive layer 19 covered by an insulating layer 20. Both layers are preferably applied in liquid form by respective materials that cure after application.

FIG. 12b shows that for the formation of a conductive layer electrically conductive particles 21 for example are bound in an insulating binder 22, here on the edge 1A of the eyeglass lens.

The invention claimed is:

1. A method comprising the steps of:
    machining from a lens blank an eyeglass lens having a shaped edge;
    measuring a thickness of the edge of the eyeglass lens at a plurality of peripherally offset measuring positions and generating respective control values corresponding thereto;
    supplying the control values to an applicator;
    applying with the applicator a hardenable material in liquid form to the edge of the eyeglass lens;
    controlling the applicator such that an amount and/or position of the material is applied at the measuring positions according to the respective control values in a controlled manner; and
    chemically or radiation-curing this material to form on the edge of the lens a functional layer that has an optical, magnetic, electric, or electronic function.

2. The eyeglass lens made according to the method of claim 1, wherein the functional layer performs an optical function by
    a) forming a mechanical polish of the edge in that a roughness of the functional layer is smaller than a roughness of the edge on which the functional layer is applied, or
    b) forming a waveguide on or along part of the edge circumferentially of the lens, or
    c) forming a thermochromic or electrochromic layer on or along part of the front or back eyeglass lens surface, or
    d) forming a light-emitting element.

3. The eyeglass lens made according to the method of claim 1, wherein the functional layer performs a magnetic function with a magnetic field generated by the functional layer or a magnetizability of the functional layer under action of a magnetic field on the functional layer by magnetic or magnetizable particles embedded in the functional layer.

4. The eyeglass lens according to claim 3, wherein a magnetically acting functional layer forms a holding element for fastening the eyeglass lens to another element.

5. The eyeglass lens made according to the method of claim 1, wherein the functional layer performs an electric or electronic function by
    a) electric conductivity of the functional layer itself or elements embedded therein, or
    b) providing a plurality of functional layers with respect to each other and one upon and/or next to each other so as to form by their arrangement with respect to each other together a electric or electronic component, or
    c) storing electric energy in the functional layer.

6. The eyeglass lens made according to the method of claim 1, wherein the functional layer comprises a coupling element for inputting an optical or electric signal into the functional layer.

7. The method according to claim 1, wherein the material is applied in a plurality of parallel strands.

8. The method according to claim 1, further comprising the step of:
    inserting a coupling element into the not yet cured material upon the application thereof, the coupling element serving for inputting an optical or electric signal into the cured layer.

* * * * *